US012601863B2

(12) United States Patent
Nakamura

(10) Patent No.: US 12,601,863 B2
(45) Date of Patent: Apr. 14, 2026

(54) OPTICAL SYSTEM AND OPTICAL APPARATUS HAVING THE SAME

(71) Applicant: CANON KABUSHIKI KAISHA, Tokyo (JP)

(72) Inventor: Tsubasa Nakamura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 333 days.

(21) Appl. No.: 18/357,238

(22) Filed: Jul. 24, 2023

(65) Prior Publication Data

US 2023/0367042 A1     Nov. 16, 2023

Related U.S. Application Data

(63) Continuation of application No. PCT/JP2022/000357, filed on Jan. 7, 2022.

(30) Foreign Application Priority Data

Feb. 10, 2021     (JP) .................................. 2021-019615

(51) Int. Cl.
 *G02B 5/02*     (2006.01)
 *G01J 3/02*     (2006.01)
 (Continued)

(52) U.S. Cl.
 CPC .......... *G02B 5/0215* (2013.01); *G01J 3/0235* (2013.01); *G01J 3/2823* (2013.01);
 (Continued)

(58) Field of Classification Search
 CPC ...... G02B 5/02; G02B 5/0205; G02B 5/0221; G02B 5/0226; G02B 5/0252; G02B 27/64;
 (Continued)

(56) References Cited

U.S. PATENT DOCUMENTS

| 6,897,911 B2 * | 5/2005 | Yamaguchi ....... G02F 1/133504 |
| | | 359/620 |
| 8,164,711 B2 * | 4/2012 | Shiraishi ........... G02F 1/133615 |
| | | 362/626 |

(Continued)

FOREIGN PATENT DOCUMENTS

| JP | 2013-64985 A | 4/2013 |
| JP | 2019-82412 A | 5/2019 |

(Continued)

OTHER PUBLICATIONS

International Preliminary Report on Patentability issued in corresponding International Application No. PCT/JP2022/000357, dated Aug. 15, 2023, pp. 1-6, with English translation.

(Continued)

*Primary Examiner* — Sharrief I Broome
*Assistant Examiner* — Journey F Sumlar
(74) *Attorney, Agent, or Firm* — Carter, DeLuca & Farrell LLP

(57) ABSTRACT

An optical system includes a diffusion element configured to diffuse an incident light beam at a diffusion point and to emit diffused light, and an imaging element configured to form an image of the diffusion point. Peak intensities in a diffusion angle distribution characteristic of the diffused light are discrete. A predetermined condition is satisfied.

17 Claims, 12 Drawing Sheets

(51) Int. Cl.
| | |
|---|---|
| *G01J 3/28* | (2006.01) |
| *G02B 5/20* | (2006.01) |
| *G02B 19/00* | (2006.01) |

(52) U.S. Cl.
CPC ........... *G02B 5/0278* (2013.01); *G02B 5/201* (2013.01); *G02B 19/009* (2013.01); *G01J 2003/2826* (2013.01)

(58) Field of Classification Search
CPC .. G02B 5/0273; G02B 5/0278; G02B 5/0284; G02B 5/0294; G01J 3/0235; G01J 3/2823
See application file for complete search history.

(56) References Cited

U.S. PATENT DOCUMENTS

| | | | | |
|---|---|---|---|---|
| 11,438,493 | B2 | 9/2022 | Nakamura | |
| 2005/0018422 | A1* | 1/2005 | Rutkowski | F21V 17/102 |
| | | | | 362/208 |

| | | | | |
|---|---|---|---|---|
| 2009/0244447 | A1* | 10/2009 | Hou | G02B 5/3025 |
| | | | | 359/485.02 |
| 2009/0296374 | A1* | 12/2009 | Kim | G02B 5/0278 |
| | | | | 264/1.36 |
| 2018/0187860 | A1* | 7/2018 | Johnson | H05B 45/10 |
| 2018/0306404 | A1* | 10/2018 | Hanashima | G02B 1/118 |

FOREIGN PATENT DOCUMENTS

| | | |
|---|---|---|
| JP | 2020-64164 A | 4/2020 |
| JP | 2021-5054 A | 1/2021 |

OTHER PUBLICATIONS

International Search Report issued by the Japan Patent Office on Mar. 29, 2022 in corresponding International Application No. PCT/JP2022/000357, with English translation.

* cited by examiner

FIG. 5A
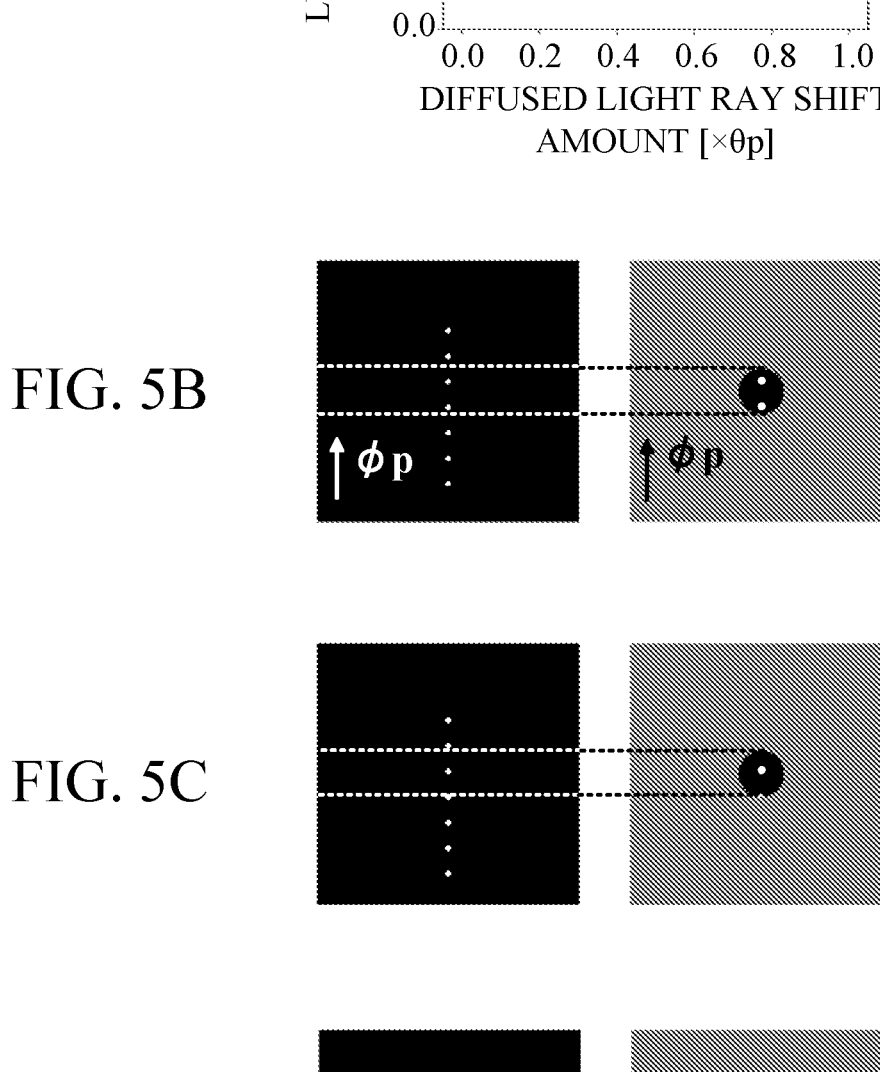
FIG. 5B
FIG. 5C
FIG. 5D
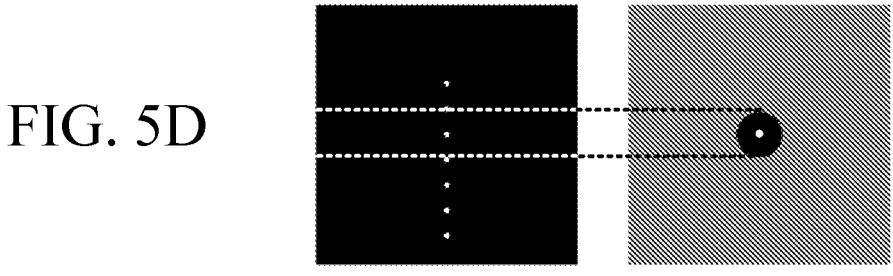

FIG. 8A
LUMINANCE RATIO
FIG. 8B
FIG. 8C
FIG. 8D
DIFFUSED LIGHT RAY SHIFT
AMOUNT [×θp]
FIG. 8B
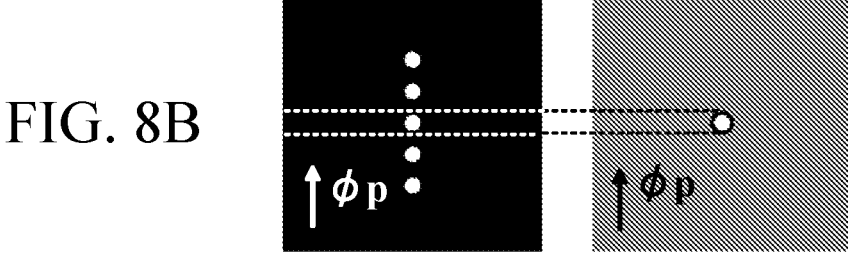
FIG. 8C
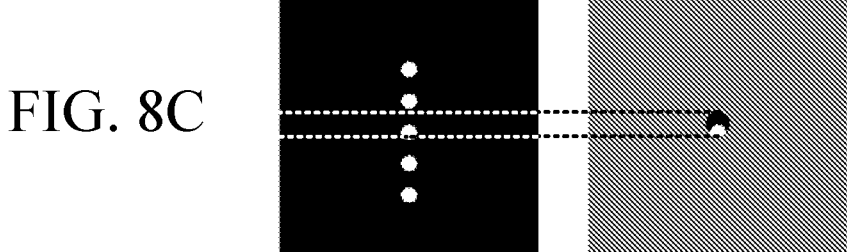
FIG. 8D
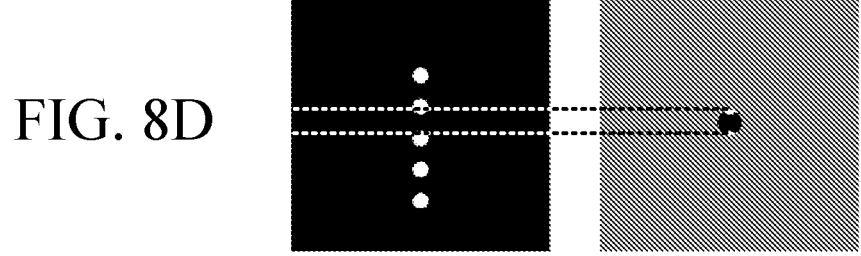

FIG. 9A
LUMINANCE RATIO
FIG. 9B
FIG. 9C
DIFFUSED LIGHT RAY SHIFT
AMOUNT [×θp]
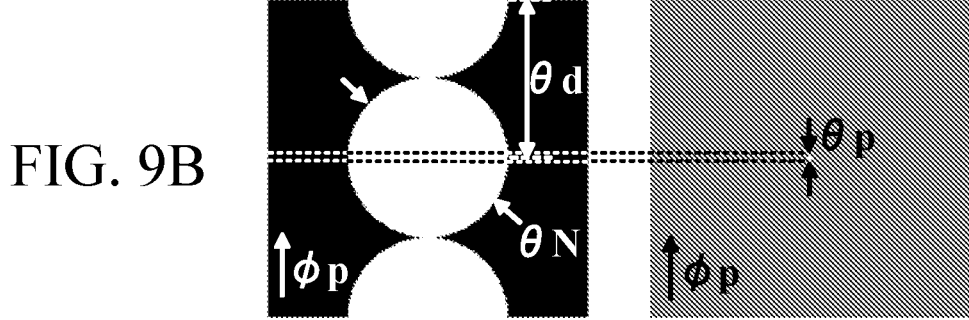
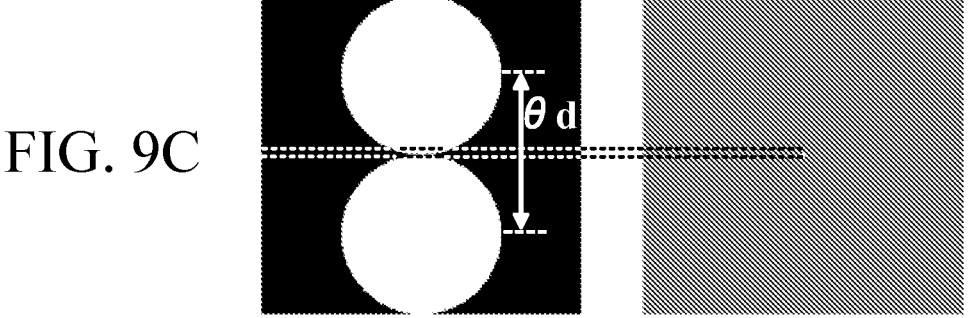

OPTICAL SYSTEM AND OPTICAL APPARATUS HAVING THE SAME

CROSS-REFERENCE TO RELATED APPLICATIONS

This application is a Continuation of International Patent Application No. PCT/JP2022/000357, filed on Jan. 7, 2022, which claims the benefit of Japanese Patent Application No. 2021-019615, filed on Feb. 10, 2021, both of which are hereby incorporated by reference herein in their entirety.

BACKGROUND

Technical Field

One of the aspects of the embodiments relates to an optical system and an optical apparatus having the same.

Description of Related Art

Japanese Patent Laid-Open No. 2019-82412 discloses a spectroscopic camera that includes a microlens array (MLA) including a lens unit with a minute diameter and disposed as a diffusing plate at an imaging position of an intermediate image formed by an objective lens.

In a case where an intermediate image is re-formed using an imaging element, an uneven structure on the MLA surface may be as small as possible so that the MLA surface is not visually recognized, but the wave effects of light cannot be ignored in a case where the structural scale is on the order of several tens of micrometers. In a case where the effective diameter of the imaging element is smaller than the pitch of the diffused light (diffracted light) from the MLA, the diffused light may not enter the imaging element. Even if the effective diameter of the imaging element is about as large as the pitch of the diffused light, the distribution of the diffused light forms a striped pattern superimposed on the re-imaged image on the imaging plane, and the image quality deteriorates.

SUMMARY

An optical system according to one aspect of the disclosure includes a diffusion element configured to diffuse an incident light beam at a diffusion point and to emit diffused light, and an imaging element configured to form an image of the diffusion point. Peak intensities in a diffusion angle distribution characteristic of the diffused light are discrete. The following inequality is satisfied:

$$1.0 < (\theta p + \theta N)/\theta d < 300.0$$

where $\theta d$ is a maximum value of intervals between the peak intensities in the diffusion angle distribution characteristic, $\theta p$ is an angle range of an entrance pupil of the imaging element with respect to the diffusion point, and $\theta N$ is an effective spread angle of the diffused light. An optical apparatus having the above optical system also constitutes another aspect of the disclosure.

Further features of the disclosure will become apparent from the following description of embodiments with reference to the attached drawings.

BRIEF DESCRIPTION OF THE DRAWINGS

FIGS. 5A, 5B, 5C, and 5D illustrate an example that improves diffraction stripes according to the first embodiment.

FIGS. 6A, 6B, and 6C illustrate another example that improves diffraction stripes according to the first embodiment.

FIGS. 8A, 8B, 8C, and 8D illustrate an example that improves diffraction stripes according to the second embodiment.

FIGS. 9A, 9B, and 9C illustrate an example that improves diffraction stripes according to the second embodiment.

DESCRIPTION OF THE EMBODIMENTS

Figure 1:
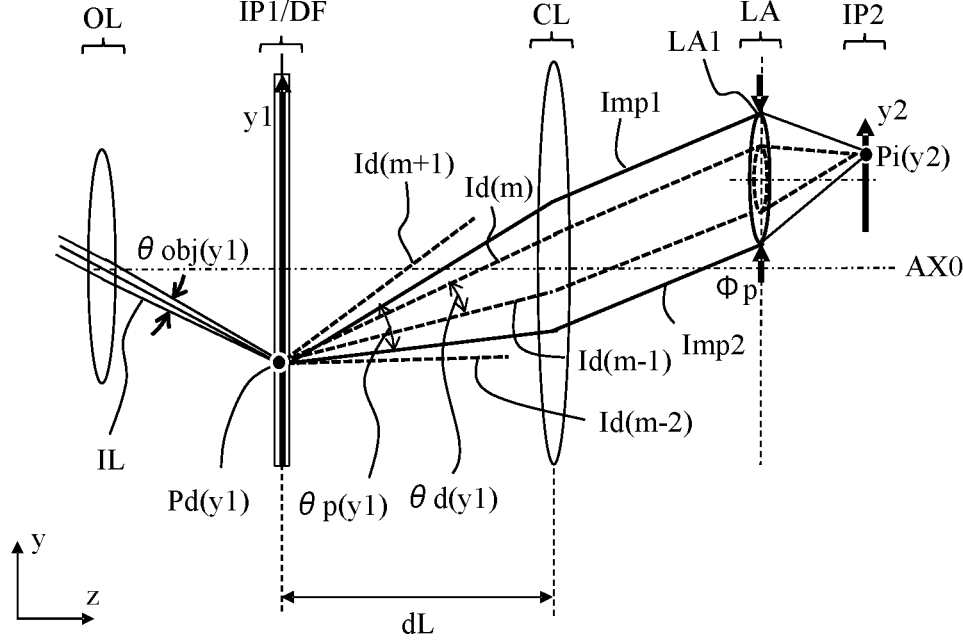
FIG. 1 is a schematic diagram of an optical apparatus according to a first embodiment.

Referring now to the accompanying drawings, a detailed description will be given of embodiments according to the disclosure. Corresponding elements in respective figures will be designated by the same reference numerals, and a duplicate description thereof will be omitted.

First Embodiment

FIG. 1 is a schematic diagram of an optical apparatus according to this embodiment. In FIG. 1, a left side is an object side, and a right side is an image side. The optical apparatus includes, in order from the object side to the image side, an objective lens (condenser optical system) OL, a diffusing plate DF, and a relay optical system. In this embodiment, the relay optical system includes, in order from the object side to the image side, a collimator lens CL and a lens array (imaging array) LA.

The diffusing plate DF is disposed on a primary imaging plane (intermediate image plane) IP1, which is a condensing surface of the objective lens OL disposed on the object side of the diffusing plate DF. An incident light beam IL from the objective lens OL is condensed at an incident angle $\theta$obj with respect to the diffusing plate DF to form a light point (diffusion point) Pd on the diffusing plate DF. The light points Pd are continuously formed on the diffusing plate DF along a y1-axis to form an object image on the primary imaging plane IP1. FIG. 1 illustrates a representative point of the light point Pd as a light point Pd(y1) at a coordinate y1.

The diffusing plate DF diffuses the incident light beam IL from the light point Pd to the image side as diffused light with a diffusion angle distribution characteristic having discrete peak intervals mainly due to the wave optics diffraction. FIG. 1 illustrates a plurality of light rays with maximum intensities by dashed lines as diffused light rays Id. A suffix m is a number (serial number) for distinguishing the diffused rays. In this embodiment, the diffusing plate DF has a microlens array (MLA) structure including periodic lenses with small diameters.

Part of the diffused light rays Id is imaged on a secondary imaging plane IP2 via the relay optical system. The relay optical system is configured such that the light point Pd and an imaging point Pi on the image plane have a conjugate relationship in the geometrical optics. In other words, a group of light points Pd on the primary imaging plane IP1 (primary image) is re-imaged on the secondary imaging plane IP2.

The optical apparatus may include an image sensor configured to convert an optical image formed on an imaging plane into an electrical signal. In this case, the imaging plane of the image sensor is disposed on the secondary imaging plane IP2.

Although not illustrated in FIG. 1 for simplification, a plurality of imaging lenses (imaging portions) LA1 are arranged in a direction orthogonal to a principal optical axis AX0. Therefore, the lens array LA forms a plurality of images corresponding to the plurality of imaging lenses LA1 on the secondary imaging plane IP2. Although FIG. 1 describes the optical function of a single imaging lens LA1 as a representative, this is similarly applied to the other imaging lenses LA1 in the lens array LA.

In this embodiment, parallel light from the collimator lens CL enters the imaging lens LA1 (lens array LA). Even if the position of the imaging lens LA1 (lens array LA) shifts within the plane orthogonal to the optical axis, this configuration can reduce the influence on imaging performance.

In this embodiment, $Id(m)$ is a representative of the diffused light beams entering an aperture of the imaging lens LA1, and the adjacent diffused light beam $Id(m-1)$ also enters the same aperture. An angle formed by the diffused light beams $Id(m)$ and $Id(m-1)$ (the maximum value of the peak intervals of the diffused angle distribution of the diffused light at the light point Pd) is defined as a diffused light ray interval $\theta d(=\theta d(y1))$.

Figure 2B:
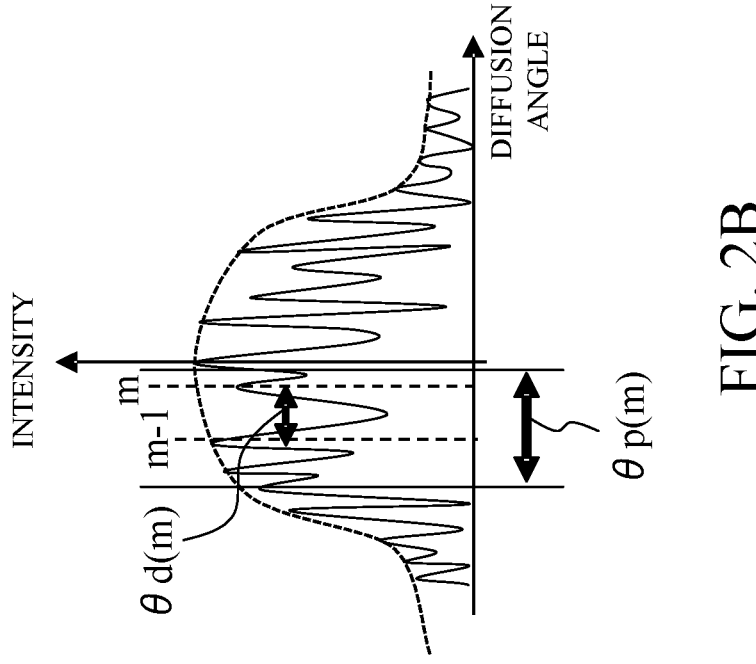
FIGS. 2A and 2B explain an interval between diffused light rays.
Figure 2A:
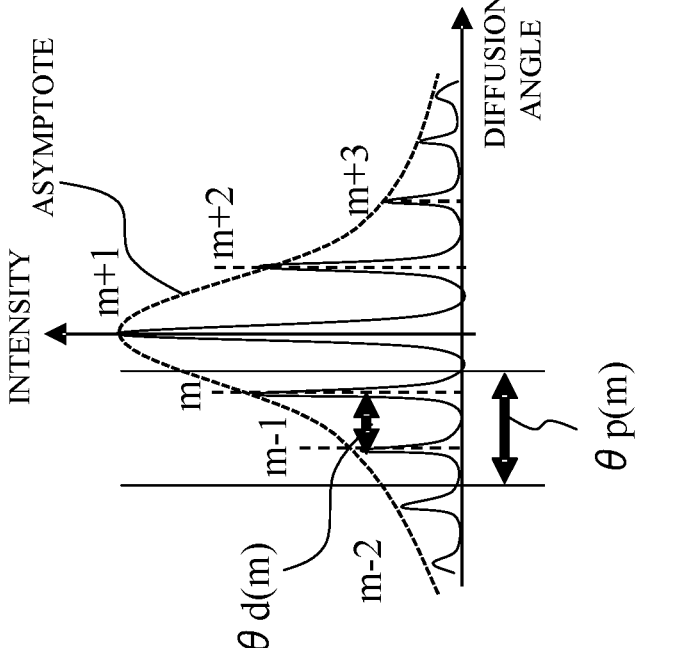

A description will now be supplemented of a method of defining the diffused light ray interval $\theta d$. In a case where the diffusing plate DF has a periodic structure like the MLA structure, the diffused light rays Id are emitted from the light point Pd and diffused at the diffused light ray interval $\theta d$ determined by the pitch p of the periodic structure and the wavelength $\lambda$ of the incident light beam IL. In FIG. 2A, a horizontal axis represents a diffusion angle, and a vertical axis represents the intensity. A symbol m written on the local maximum point corresponds to the subscript m of the diffused light ray Id in FIG. 1. Each diffused light ray Id in FIG. 1 is illustrated by dashed lines representing a plurality of maximum diffusion angles in FIG. 2A. An interval between a reference diffused ray $Id(m)$ incident on the aperture and an adjacent diffused ray $Id(m-1)$ among the diffused light rays Id is defined as the diffused light ray interval $\theta d(m)$.

In this embodiment, the diffused light is emitted with a diffusion angle distribution having regular intervals due to diffraction, but this embodiment is not limited to this example. For example, as illustrated in FIG. 2B, the diffused light may be emitted so that the peak intervals has a non-uniform diffusion angle distribution within a range of the pupil angle $\theta p$ of the entrance pupil of the imaging lens LA1 viewed from the light point Pd. More specifically, the pupil angle $\theta p$ is an angle formed by a straight line connecting both ends of the entrance pupil of the imaging lens LA1 and the light point Pd in a section including the optical axis. In this case, as illustrated in FIG. 2B, the diffused light ray interval $\theta d(m)$ may be defined as the maximum value of the peak intervals in the diffusion angle distribution of the diffused light within a range of the pupil angle $\theta p$.

FIG. 1 illustrates marginal rays determined by the light point Pd and an effective diameter of the imaging lens LA1 (a diameter of an effective region through which the rays contributing to imaging pass) $\Phi p$ as rays Imp1 and Imp2. An angle difference made by tracing the light rays Imp1 and Imp2 toward the object side up to the light point Pd corresponds to the pupil angle $\theta p(=\theta p(y1))$.

Figure 3A:
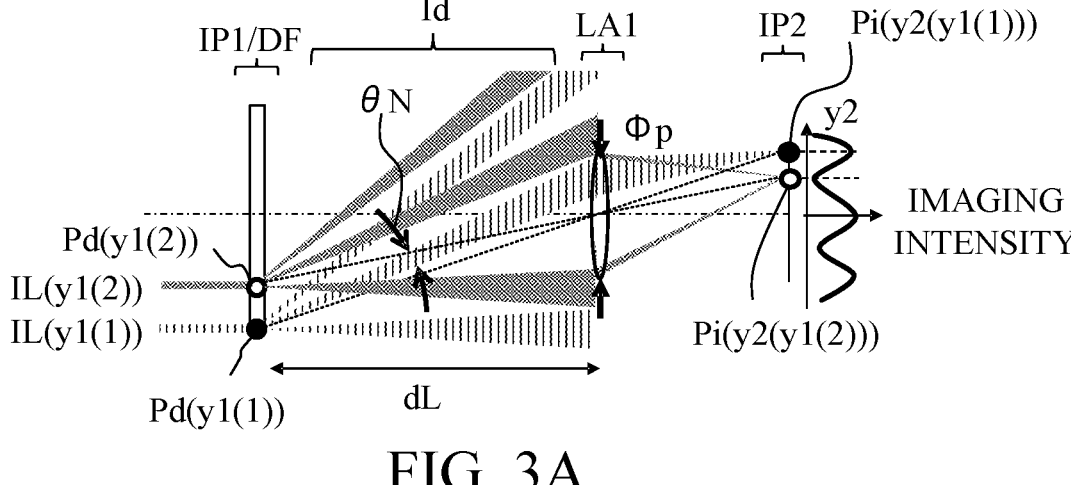
FIGS. 3A and 3B explain the principle of occurrence of the problem in each embodiment.
Figure 3B:
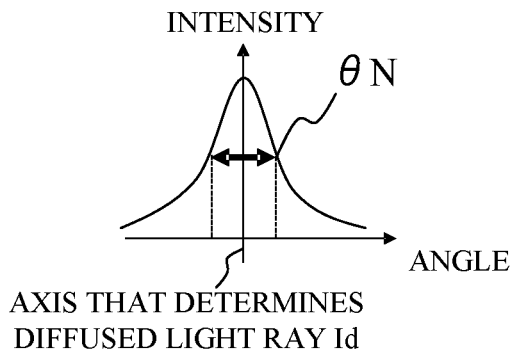

Referring now to FIGS. 3A and 3B, a description will be given of the principle of occurrence of the problem of the present disclosure. FIGS. 3A and 3B explain the principle of the problem of the present disclosure. FIG. 3A is a schematic diagram of the optical apparatus according to this embodiment in which the collimator lens CL is omitted and only the imaging lens LA1 is disposed for simple explanation. In a case where a lens with a bright F-number is disposed as the objective lens OL, an incident angle $\theta obj$ of the incident light beam IL increases, and a spread angle $\theta N$ of the diffused light rays Id (effective spread angle determined by the effective diffusion angle $\theta w$ at the light point Pd), which will be described below, also increases in proportion to the incident angle $\theta obj$. A description will now be given of a case where thin parallel light (having a sufficiently dark F-number) as the incident light beam IL having the same intensity and horizontal to the optical axis enters the diffusing plate DF.

In order to understand the phenomenon, we first focus on two points y1(1) and y1(2) separated from each other on the primary imaging plane IP1 as representative points. For the respective representative points, incident light beams are labelled as IL(y1(1)) and IL(y1(2)), light points (light spots) are labelled as Pd(y1(1)) and Pd(y1(2)), and imaging points are labelled as Pi(y2(y1(1))) and Pi(y2(y1(2))). In the following description, obvious symbols in parentheses will be omitted. The incident light beam IL incident on the point y1(1) diffuses backward as diffused light rays Id (indicated by vertical patterns in the figure) having a diffusion angle distribution characteristic with discrete peak intervals at the light point Pd.

The diffused light rays Id generally have a spread angle (divergence angle) during diffusion. In reality, the intensity of the diffused light continuously changes and has no clear boundary, so here is defined by a half width (full width at half maximum: FWHM) of the intensity distribution as illustrated in FIG. 3B. This half width is defined as an effective diffusion angle $\theta N$ (simply referred to as "spread angle" hereinafter).

In a case where another optical element (collimator lens CL in this embodiment) is disposed between the diffusing plate DF and the imaging lens LA1, the spread angle $\theta N$ may change due to the optical action such as refraction. At this time, the diffused light rays Id incident on the aperture are traced back, and the angle immediately after the light point Pd is used as the spread angle $\theta N$. This is similarly applied to the diffused light ray interval $\theta d$ and the pupil angle $\theta p$. In order to match the conditions, each value is acquired by an observation at the same point, and in this embodiment, the light point Pd is used as a reference.

The spread angle $\theta N$ is proportional to the diffusion power and the incident angle $\theta obj$ of the incident light beam IL (or the F-number of the objective lens OL) at the light point Pd. However, in a case where the spread angle $\theta N$ is observed from the imaging lens LA1, the past influence cannot be distinguished and thus this embodiment focuses only on the post-diffusion spread angle θN and equally treats factors that determine the spread angle θN.

The imaging lens LA1 converges the diffused light rays Id incident on the aperture to form the imaging point Pi. The position of the imaging point Pi is determined by geometrical optics (once the optical arrangement is determined, the points y1 and y2 are in the conjugate relationship, so y2=y2(y1) is established). Since the imaging intensity of the imaging point Pi is determined by the total amount of diffused light rays Id incident on the aperture, it is necessary to consider the non-uniform intensity distribution derived from diffraction. Since many diffused light rays Id from the light point Pd(y1(1)) enter the effective diameter Φp, the imaging point Pi(y2(y1(1))) is bright (has high intensity). On the other hand, the diffused light rays Id from the light point Pd(y1(2)) hardly enter the aperture, so the luminance of the imaging point Pi(y2(y1(2))) is minimal. Since the amount of light rays incident on the aperture along the primary imaging plane IP1 continuously changes in this way, a striped pattern intensity distribution appears on the secondary imaging plane IP2. Such an intensity distribution more clearly appears in a case where light of the same intensity enters the primary imaging plane IP1, that is, in a case where an all-white image is formed. This stripe that deteriorates the image quality deterioration will be referred to as "diffraction stripes (or diffraction fringes)" hereinafter. As described above, image quality deteriorates due to wave optics or the relationship among the characteristic of the incident light beam IL, the diffusion characteristic of the diffusing plate DF, and the aperture of the imaging lens LA1. One of the embodiments can suppress this image quality deterioration.

Figure 4:
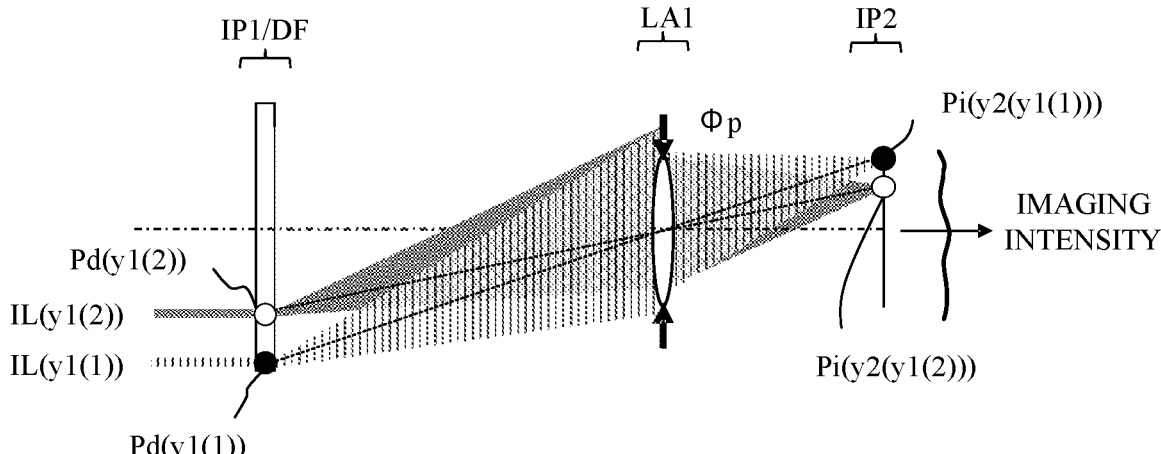
FIG. 4 explains a configuration for realizing each embodiment.

In order to suppress the image quality deterioration, this embodiment properly sets a relationship between the pupil angle θp of the imaging lens LA1 and the diffused light ray interval θd. By setting the diffused light ray interval θd to be small, this embodiment increases the number of diffused light rays Id incident on the aperture as much as possible, as illustrated in FIG. 4. Thereby, even if the light point Pd moves on the primary imaging plane IP1, a fluctuation amount in the diffused light rays Id incident on the aperture is extremely small relative to the total amount of light beam incident on the aperture. The diffraction stripes on the secondary imaging plane IP2 are suppressed. Therefore, the optical apparatus according to this embodiment satisfies the following inequality (1):

$$1.0 < \theta p/\theta d < 300.0 \tag{1}$$

In a case where the value becomes lower than the lower limit of inequality (1), diffraction stripes become more intense, and not only the image quality deteriorates, but almost no areas are left in the image where the luminance remains. Even if a lens with a bright F-number is placed in the objective lens OL to increase the spread angle θN of the diffused light rays Id, it is difficult to suppress diffraction stripes within the realistic specification of the objective lens OL. It is necessary to dispose an expensive lens with a large diameter in the lens OL. In a case where the value becomes higher than the upper limit of inequality (1), the diffusing plate DF needs to be processed to have a precise surface structure in consideration of the wave optics effect, and the manufacturing cost of the diffusing plate DF increases.

Inequality (1) may be replaced with inequality (1a) below:

$$1.2 < \theta p/\theta d < 200.0 \tag{1a}$$

Inequality (1) may be replaced with inequality (1b) below:

$$1.4 < \theta p/\theta d < 100.0 \tag{1b}$$

Inequality (1) may be replaced with inequality (1c) below:

$$1.5 < \theta p/\theta d < 50.0 \tag{1c}$$

Inequality (1) may be replaced with inequality (1d) below:

$$1.6 < \theta p/\theta d < 30.0 \tag{1d}$$

In a case where the diffusing plate DF has a diffusion surface having a structure that is periodically arranged (periodical structure), and the light point Pd and the imaging lens LA1 are disposed near the principal optical axis AX0, the diffused light ray interval θd is expressed by the following equation within at least the pupil angle θp:

$$\theta d = \arc\sin(\lambda/p)$$

where λ is a wavelength of light imaged by the imaging lens LA1, and p is a pitch of the structure.

The diffused light ray interval θd can be further approximated and expressed by the following equation:

$$\theta d \approx \lambda/p$$

In a case where the relay optical system has a collimator lens, a ratio θp/θd between the pupil angle θp and the diffused light ray interval θd is expressed by the following equation:

$$\theta p/\theta d \approx \Phi p/(4*dL*\tan(\theta d/2)) \approx \Phi p/(4*dL*\tan(\lambda/(2p)))$$

where dL is a distance on the principal optical axis AX0 between the diffusing plate DF and the relay optical system.

In a case where the diffused light ray interval θd is sufficiently small, the ratio θp/θd is expressed by the following equation. The unit of the diffused light ray interval θd is rad.

$$\theta p/\theta d \approx \Phi p/(2*dL*\theta d) \approx (p*\Phi p)/(2*dL*\lambda)$$

The above approximation equation can be used to estimate the overall configuration.

FIGS. 5A to 6C illustrate examples that improve diffraction stripes. In a case where the light point Pd moves along the y1-axis on the primary imaging plane IP1, the incident position of the diffused light ray Id on the aperture also shifts along the y1-axis. At this time, the total amount of diffused light rays Id incident on the aperture determines the luminance. In FIGS. 5A and 6A, each horizontal axis represents a relative positional shift amount (in units of angle) of the diffused light ray Id incident on the aperture in the y1-axis direction, and each vertical axis represents a luminance ratio. The values on the horizontal axis are normalized by the pupil angle θp, and they are values in a case where the diffused light ray Id moves from the upper end to the lower end of the aperture. FIGS. 5B, 5C, and 5D (FIGS. 6B, 6C, and 6D) illustrate a relation position relationship between the diffused light ray Id and the pupil coordinate (pp, which is an angle within the pupil angle θp at points (b), (c), and (d) in FIG. 5A (points (b), (c), and (d) in FIG. 6A), respectively. In FIGS. 5B to 5D (FIGS. 6B to 6D), left views illustrate the shift in the (pp-axis direction of the diffused light ray Id, and right views illustrate the shift masked by the pupil angle θp.

In FIGS. 5A to 5D, the wavelength is 850 [nm], the pitch of the MLA on the diffusing plate DF surface is 50 [μm], and the diffused light ray interval θd is 1 [deg]. In a case where the distance dL between the diffusing plate DF and the collimator lens CL is 260 [mm] and the effective diameter $\Phi p$ is 8 [mm], the pupil angle $\theta p$ is 1.8 [deg] and the ratio $\theta p/\theta d$ is 1.8.

Now focus on the number of diffused light rays Id that have passed through the apertures in the right views in FIGS. 5B to 5D. Then, the luminance becomes maximum with two incident spots (diffused light rays Id), and as the number of spots decreases, the luminance decreases. In FIGS. 5A to 5D, even in the area where the luminance is the lowest (for example, point (d) in FIG. 5A), there is still a spot incident on the aperture, so the minimum value of the luminance ratio is about 0.5, and the diffraction stripes are suppressed.

Figures 6A, 6B, 6C:
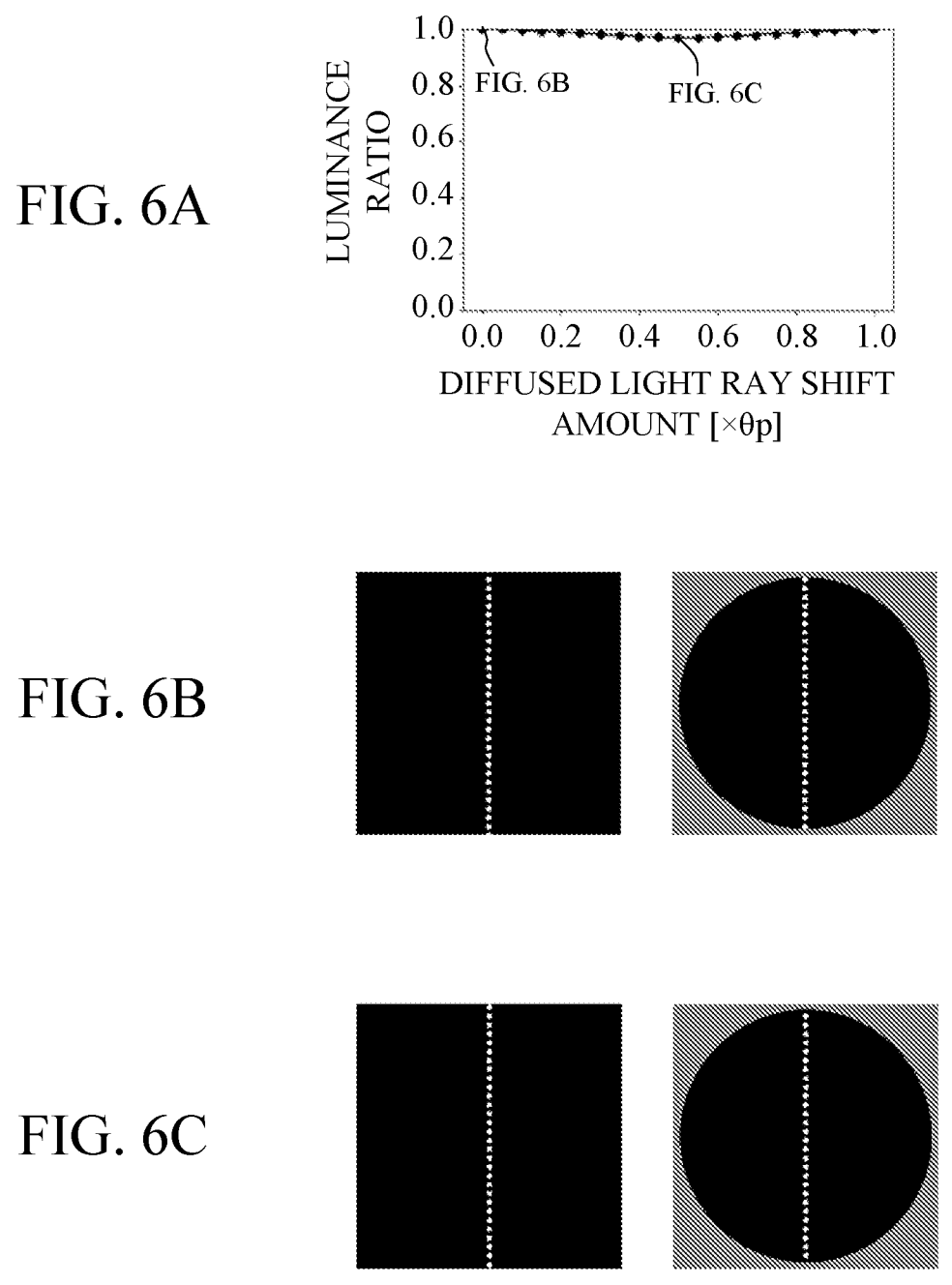

In FIGS. 6A, 6B, and 6C, the wavelength is 700 [nm], the pitch of the MLA on the diffusing plate DF surface is 120 [μm], and the diffused light ray interval $\theta d$ is 0.3 [deg]. In a case where the distance dL between the diffusing plate DF and the collimator lens CL is 180 [mm] and the effective diameter $\Phi p$ is 30 [mm], the pupil angle $\theta p$ is 9.5 [deg] and the ratio $\theta p/\theta d$ is 28.5. The number of spots decreases as the diffused light rays Id shift within the aperture. Since the number of missing spots is small relative to the total number of spots incident on the aperture, the decrease in luminance ratio is suppressed in comparison with the case of FIGS. 5A to 5D. In FIGS. 6A, 6B, and 6C, the decrease in luminance ratio is about 0.03 to 0.05, and diffraction stripes are suppressed.

As the value of the ratio $\theta p/\theta d$ increases, the decrease in luminance ratio is suppressed, so a proper configuration may be selected according to the accuracy required for the imaging system.

The above configuration can suppress the influence of image quality deterioration caused by diffraction stripes due to the diffusion characteristic of the diffusing plate.

In this embodiment, the objective lens OL and the incident light beam IL are respectively a lens for forming an object image and its imaging light beam, but the present disclosure is not limited to this example. As long as a light point is generated on the diffusing plate DF, the objective lens OL and the incident light beam IL may be replaced with a projection apparatus or projected light by laser scanning. The incident light beam IL does not necessarily have to be condensed, and may be in the form of a spot. In this case, the light point Pd has a width to some extent.

In this embodiment, the diffusing plate DF includes a transmission type diffusion element, but may include a reflection type diffusion element as long as it has similar diffusion characteristics. In that case, the optical path (optical axis) is folded back on the diffusing plate surface, but as long as the subsequent optical arrangement is the same, the principle explained in this embodiment can be utilized.

Second Embodiment

Figure 7:
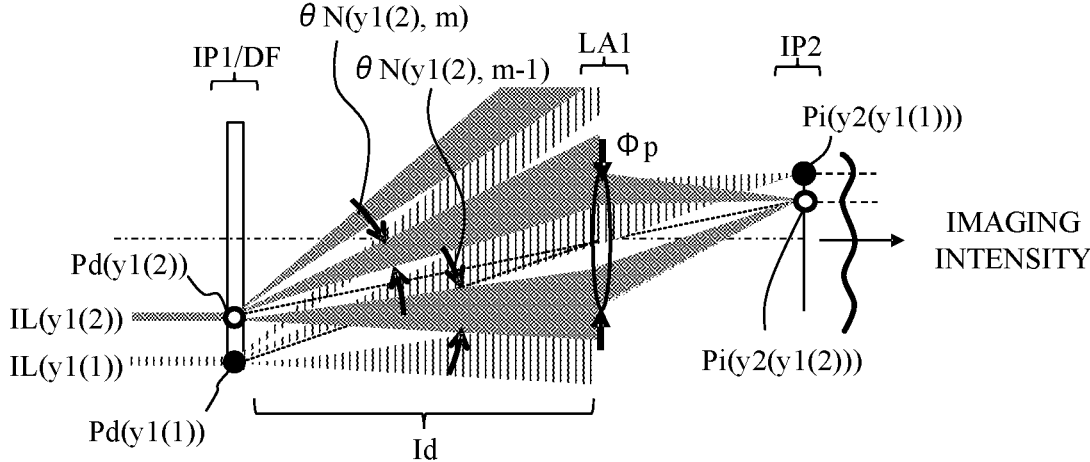
FIG. 7 explains a method of suppressing diffraction stripes according to a second embodiment.

In order to suppress diffraction stripes, this embodiment will discuss a method of increasing the spread angle of diffused light rays and increasing the amount of light beam incident on the aperture. FIG. 7 explains a method of suppressing diffraction stripes in this embodiment. In this embodiment, a detailed description of configurations similar to those of the first embodiment will be omitted.

In order to increase the spread angle $\theta N$ of the diffused light ray Id, this embodiment will discuss a method of using a lens with a bright F-number as the objective lens OL and increasing the incident angle $\theta obj$ of the incident light beam IL. As described in the first embodiment, it is unknown by what action the spread angle $\theta N$ is determined when viewed from the aperture. This embodiment assumes that the spread angle $\theta N$ is determined by the relationship between the light ray characteristic from the diffusing plate DF and the effective diameter $\Phi p$.

As illustrated in FIG. 7, in a case where the spread angle $\theta N$ of each of the plurality of diffused light rays Id incident on the aperture is wide, a gap between the diffused light rays (area where no light rays exist) becomes relatively small. That is, since the angle area where the intensity of the imaging point Pi is weakened becomes smaller, the lower limit of luminance of the dark area of the diffraction stripes increases. That is, diffraction stripes can be suppressed by the configuration according to this embodiment.

In a case where the spread angles $\theta N$ of the plurality of diffused light rays Id incident on the aperture are approximately the same, the following inequality (2) may be satisfied:

$$1.0<(\theta p+\theta N)/\theta d<300.0 \tag{2}$$

In a case where the value becomes higher than the upper limit of inequality (2), diffraction stripes more intensely occur and the image quality deteriorates. In addition, almost no area remains bright. In a case where the value becomes lower than the lower limit of inequality (2), the manufacturing cost of the diffusing plate DF increases.

Inequality (2) may be replaced with inequality (2a) below:

$$1.0<(\theta p+\theta N)/\theta d<200.0 \tag{2a}$$

Inequality (2) may be replaced with inequality (2b) below:

$$1.0<(\theta p+\theta N)/\theta d<100.0 \tag{2b}$$

Inequality (2) may be replaced with inequality (2c) below:

$$1.1<(\theta p+\theta N)/\theta d<50.0 \tag{2c}$$

Inequality (2) may be replaced with inequality (2d) below:

$$1.2<(\theta p+\theta N)/\theta d<30.0 \tag{2d}$$

Near the principal optical axis AX0, the spread angle $\theta N$ can be expressed by the following approximation equation using the numerical aperture NA.

$$\theta N \approx \mathrm{arc}\ \sin(NA/n)$$

where n represents the refractive index of a medium just after the light point Pd, and is set to 1 because it is the atmosphere in a normal design.

In a case where the specification of the objective lens OL near the principal optical axis AX0 can be selected, the spread angle $\theta N$ can be expressed by the following approximate equation using the F-number Fno of the objective lens OL.

$$\theta N \approx \mathrm{arc}\ \tan(1/(2*Fno))$$

In a case where the minimum value of the spread angle $\theta N$ is $\theta N$ min, the following inequality may be met:

$$0.05<\theta N\ \mathrm{min}<20.50$$

FIGS. 8A to 9C illustrate examples that improve diffraction stripes. The relations of symbols in FIGS. 8A to 9C are similar to those in FIGS. 5A to 5D.

In FIGS. 8A to 8D, the wavelength is 850 [nm], the pitch of the MLA on the diffusing plate DF is 40 [μm], and the diffused light ray interval $\theta d$ is 1.2 [deg]. In a case where the distance dL between the diffusing plate DF and the collimator lens CL is 300 [mm] and the effective diameter $\Phi p$ is 5 [mm], the pupil angle $\theta p$ is 1.0 [deg] and the ratio $\theta p/\theta d$ is 0.8. In this case, the center axis of the diffused light ray Id does not enter the aperture, and an area occurs where the luminance becomes zero. Since the spread angle $\theta N$ is 0.6 [deg], the value $(\theta p + \theta N)/\theta d$ is 1.3, and the diffused light ray Id spread at the spread angle $\theta N$ around the diffused light rays Id always enters the aperture. The minimum value of the luminance ratio is about 0.4, and diffraction stripes are suppressed.

In FIGS. 9A to 9C, the wavelength is 2000 [nm], the pitch of the MLA on the diffusing plate DF is 4 [μm], and the diffused light ray interval $\theta d$ is 30 [deg]. In a case where the distance dL between the diffusing plate DF and the collimator lens CL is 550 [mm] and the effective diameter $\Phi p$ is 10 [mm], the pupil angle $\theta p$ is 1.0 [deg] and the ratio $\theta p/\theta d$ is 0.035. In this case, the central axis of the diffused light ray Id hardly enters the aperture. Since the spread angle $\theta N$ is set to 30 [deg], the value $(\theta p + \theta N)/\theta d$ is a little over 1.0, and any of the diffused light rays Id spread at the spread angle $\theta N$ around the diffused light rays Id enters the aperture. As illustrated in FIG. 9C, a gap between the spots formed by the diffused light rays Id is sufficiently smaller than the effective diameter $\Phi p$, so the minimum luminance ratio is 0.988.

As described above, a large pupil angle $\theta p$ and a large spread angle $\theta N$ can be treated equivalently with respect to the diffused light ray interval $\theta d$. This works effectively especially in a case where the number of diffused light rays Id incident on the aperture is small (especially in a case where $\theta p/\theta d < 1$).

In FIGS. 8A to 9C, the adjacent spots are arranged so as not to overlap each other so that each figure can be easily viewed, but a diffused light surface having no missing diffused light rays Id can be formed by increasing the overlap area between spots by increasing the spread angle $\theta N$. For example, in a case where the MLA is formed in a lattice shape and the spread angle $\theta N$ is set to 43 [deg], which is about $\sqrt{2}$ times as large as the diffused light ray interval $\theta d$, the gap between the spots disappears.

In a case where the number of diffused light rays Id incident on the aperture is large and the difference in spread angles $\theta N$ is large, the average value of spread angles $\theta N$ may be used.

The above configuration can suppress the influence of image quality deterioration due to diffraction stripes caused by the diffusion characteristic of the diffusing plate.

Third Embodiment

This embodiment will discuss a case where the diffused light rays Id two-dimensionally spread, that is, the diffused light rays Id distribute in the paper surface direction and the paper surface depth direction of FIG. 1. In this embodiment, a detailed description of configurations similar to those of the first embodiment will be omitted.

Figure 10A:
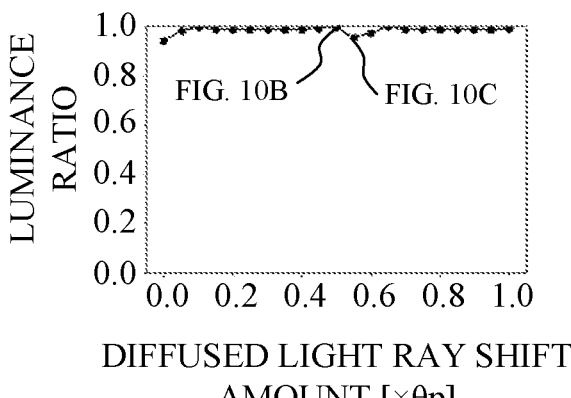
FIGS. 10A, 10B, and 10C illustrate an example that improves diffraction stripes according to a third embodiment are improved.
Figure 10B:
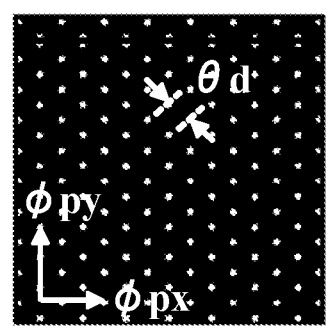
Figure 10B:
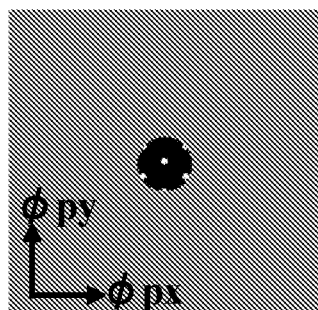
Figure 10C:
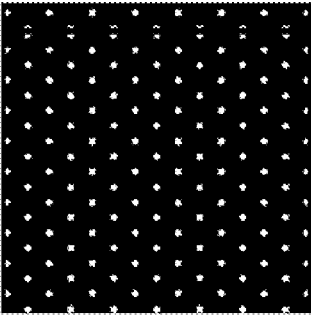
Figure 10C:
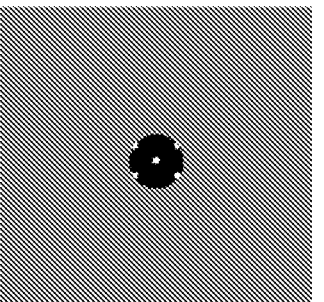

FIGS. 10A to 10C illustrate examples that improve diffraction stripes. The relations of symbols in FIGS. 10A, 10B, and 10C are similar to those in FIGS. 5A to 5D.

In FIGS. 10A to 10C, the wavelength is 850 [nm], the pitch of the MLA on the diffusing plate DF is 50 [μm], and the diffused light ray interval $\theta d$ is 1.0 [deg]. In a case where the distance dL between the diffusing plate DF and the collimator lens CL is 2600 [mm] and the effective diameter $\Phi p$ is 8 [mm], the pupil angle $\theta p$ is 1.8 [deg] and the ratio $\theta p/\theta d$ is 1.8. This embodiment considers the two-dimensional spread of the diffused light rays Id. FIGS. 10B and 10C illustrate angular axes $\Phi px$ and $\Phi py$ to reflect two-dimensional axes. An interval between adjacent spots corresponds to the diffused light ray interval $\theta d$. Although the spots are arranged in a close-packed structure in this embodiment, this embodiment is not limited to this example.

In comparison with the case of FIGS. 5A to 5D of the first embodiment, as illustrated in the right views of FIGS. 10B and 10C, even if the diffused light rays Id shift in the $\Phi py$ axis direction, many spots of diffused light rays Id incident on a range of the pupil angle $\theta p$ remain. Therefore, as illustrated in FIG. 10A, a luminance ratio hardly decreases, and diffraction stripes can be suppressed more than the case of FIGS. 5A and 5D.

As described above, the configuration that two-dimensionally spreads the diffused light rays Id can further suppress the influence of image quality deterioration due to diffraction stripes caused by the diffusion characteristic of the diffusing plate.

Fourth Embodiment

Figure 11:
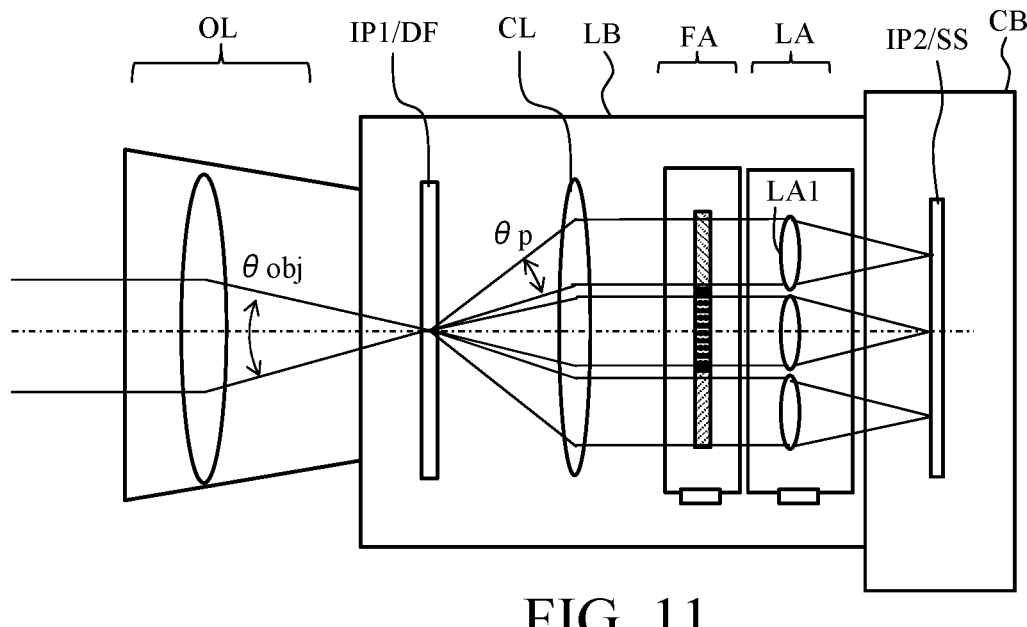
FIG. 11 is a schematic diagram of a spectroscopic camera according to a fourth embodiment.

FIG. 11 is a schematic diagram of a spectroscopic camera having the optical apparatus according to an embodiment. In this embodiment, a detailed description of configurations similar to those of the first embodiment will be omitted.

The diffusing plate DF and lens array LA are housed in a lens barrel LB. An image sensor SS is disposed at a position of the secondary imaging plane IP2 and housed in a camera body (image pickup apparatus) CB. The lens barrel LB is attachable to and detachable from the camera body CB. The lens barrel LB is disposed on the object side of the lens barrel LB, and is attachable to and detachable from the lens apparatus including the objective lens OL. That is, a lens apparatus with an arbitrary specification can be attached to the lens barrel LB. Since all of the plurality of imaging lenses LA1 in the lens array LA re-image the primary imaging plane IP1, duplicate images are formed on the secondary imaging plane IP2 by the number corresponding to the imaging lenses LA1. A filter array FA is disposed on the object side of the lens array LA in the lens barrel LB. The filter array FA includes a plurality of bandpass filters (optical filters) disposed on the optical paths of the plurality of imaging lenses LA1. The plurality of bandpass filters includes two filters having transmission characteristics different from each other. This configuration forms images on the primary imaging plane IP1, on the secondary imaging plane IP2 as different wavelength images (a plurality of types of optical images) for transmission wavelengths of the bandpass filters. A spectral image (multiband image) including wavelength information of four or more bands can be formed by combining them using an unillustrated image processing apparatus at a later stage. This embodiment disposes the bandpass filter that transmits the longest wavelength light among the plurality of bandpass filters at the center of the plurality of bandpass filters when viewed from the optical axis direction.

As long as the diffused light ray interval $\theta d$ and the pupil angle $\theta p$ of each imaging lens satisfy inequality (1) when viewed from any point on the primary imaging plane IP1, the spectroscopic camera can suppress diffraction stripes. In a case where the acquisition wavelength of the spectroscopic camera is a wavelength in the infrared region of 700 nm or longer (the light rays imaged by the imaging lens LA1 include infrared light with a wavelength of 700 nm or longer), the ratio value $\theta p/\theta d$ easily becomes or less. In particular, as the F-number of the objective lens OL becomes darker (the incident angle $\theta obj$ becomes smaller), the spread angle $\theta N$ becomes smaller and the diffraction stripes strongly appear. The conditions for the other wavelengths become mitigated by previously calculating the imaging relationship for the longest wavelength, and the design becomes easier. This embodiment may satisfy the following inequality:

$$500 < \Phi p / \lambda < 15000$$

In general, the pupil angle $\theta p$ can be considered constant near the principal optical axis AX0, but it appears to gradually become small as it moves away from the principal optical axis AX0 (appears to be collapsed in an elliptical shape). This is disadvantageous because the pupil angle $\theta p$ viewed from the light point Pd becomes relatively small. Thus, a wavelength image having a longer wavelength $\lambda$, in which a condition is strict, may be set closer to the principal optical axis AX0.

In order to suppress diffraction stripes regardless of the specification (F-number) of the objective lens OL, the ratio of inequality (1) may be increased. However, as described above, as the value becomes higher than the upper limit of inequality (1), influences of other problems become remarkable such as the cost increase of the diffusing plate DF and the size increase of the imaging lens LA1. Therefore, the ratio of inequality may be increased within a certain range.

In a case where the objective lens OL with a bright F-number can be selected, any of the spread angles $\theta N$ of the diffused light rays Id can be made large. Thus, even if the ratio $\theta p / \theta d$ is a value as small as the lower limit of inequality (1), diffraction stripes can be suppressed (within a practical range). As explained in the first embodiment, in a case where the value becomes lower than the lower limit of inequality (1), the objective lens OL with an exceptionally large aperture is required, and the cost becomes very high or the production limit is reached.

The above configuration can provide a spectroscopic camera that can suppress the influence of image quality deterioration due to diffraction stripes caused by the diffusion characteristic of the diffusing plate.

This embodiment uses the bandpass filters for the filter array FA, but any element that changes the characteristic of transmitted light can similarly act and function as a broadly-defined spectroscopic camera. For example, in a case where a plurality of types of polarizing filters are used, the spectroscopic camera can perform spectroscopy according to the polarization characteristics.

Fifth Embodiment

Figure 12A:
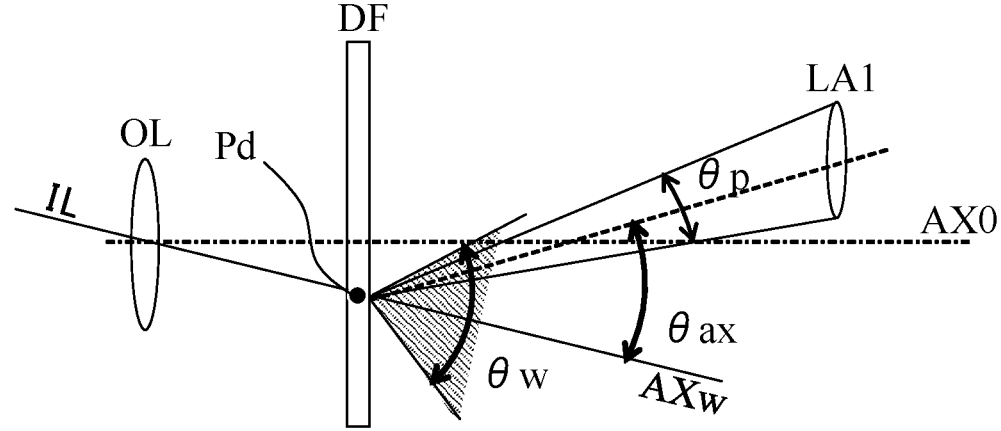
FIGS. 12A and 12B are schematic diagrams illustrating a configuration according to a fifth embodiment.
Figure 12B:
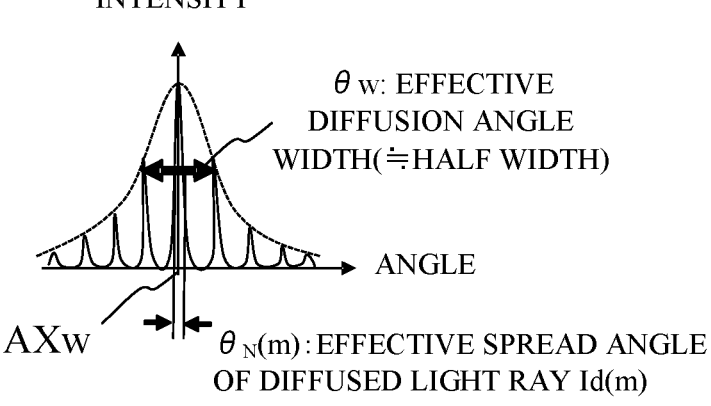

Referring now to FIGS. 12A and 12B, this embodiment will discuss conditions for re-entering the diffused light into the imaging element. FIGS. 12A and 12B are schematic diagrams illustrating the configuration according to this embodiment.

In a case where the angle of the off-axis ray of the objective lens OL is large, or in a case where the angle of the diffused light spread from the diffusing plate DF is small, even if the pupil angle $\theta p$ and the diffused light ray angle $\theta d$ have proper values, light rays may not enter the effective diameter $\Phi p$ of the imaging lens LA1. The effective diffusion angle $\theta w$ is a spread angle of the entire region of diffused light that indicates the effective range of the spread of diffused light from the light point Pd, and is an angle range in which the necessary light amount is obtained during imaging. For simplification, this embodiment uses a half width (full width at half maximum: FWHM). As described in the first embodiment, the angular distribution may have discrete luminance peaks depending on the structure of the diffusing plate DF. In this case, as illustrated in the diffusion distribution characteristic of the light point Pd in FIG. 12B, an asymptote is formed in the global distribution and the effective diffusion angle $\theta w$ is determined by the half width.

In considering the diffusion central axis of the effective diffusion angle $\theta w$ (referred to as a diffusion axis AXw hereinafter), it is first assumed that it substantially coincides with the central axis of the incident light beam IL entering from the objective lens OL. When viewed from the light point Pd, in a case where the diffusion axis AXw and the axis toward the effective diameter $\Phi p$ are greatly deviated, it is conceivable that sufficient rays for imaging may not enter the effective diameter $\Phi p$. Accordingly, an axial shift amount $\theta ax$, which is an angle between the diffusion axis AXw and the central axis of the effective diameter $\Phi p$ when viewed from the light point Pd (an angle between the principal ray of the incident light beam IL and a line connecting the light point Pd and the center of the entrance pupil of the imaging lens LA1) may satisfy the following inequality (3):

$$\theta p < \theta w - 2 \times \theta ax \qquad (3)$$

Although inequality (3) is described as an angle condition, even if there is an optical element between the diffusing plate DF and the imaging lens LA1 as described in the first embodiment, the same equation can be used since the angle viewed from the light point Pd can be defined.

FIGS. 12A and 12B illustrate a schematic diagram of a more severe condition in which the incident light beam IL is separated from the principal optical axis AX0. By disposing an optical element in front of the diffusion surface of the diffusing plate DF, the diffusion axis AXw can be bent further toward the principal optical axis AX0. For example, a lens having positive refractive power may be placed just before the diffusing plate DF so that it functions as a field lens and refract light rays incident on the diffusion surface of the diffusing plate DF toward the principal optical axis AX0. A similar effect can be obtained by disposing the MLA surface having positive refractive power. In these cases, it can be considered that the incident angle of the incident light beam IL relative to the diffusion surface has changed.

A similar effect can also be obtained by placing an optical element behind the diffusion surface. This case can be similarly processed as long as the effective diffusion angle $\theta w$ and the pupil angle $\theta p$ viewed from the light point Pd have corresponding conditions.

The above configuration can provide more suitable conditions for re-imaging of the diffused light.

Each embodiment can provide an optical system and an optical apparatus (such as an image pickup apparatus and an lens apparatus) having same, each of which can suppress the influence of the image quality deterioration due to the diffusion characteristic.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

What is claimed is:

1. An optical system comprising:
   a diffusion element configured to diffuse an incident light beam at a diffusion point and to emit diffused light, and
   an imaging element configured to form an image of the diffusion point, wherein peak intensities in a diffusion angle distribution characteristic of the diffused light are discrete, and wherein the following inequalities are satisfied:

$$1.0 < (\theta p + \theta N)/\theta d < 300.0$$

where $\theta d$ is a maximum value of intervals between the peak intensities in the diffusion angle distribution characteristic, $\theta p$ is an angle range of an entrance pupil of the imaging element with respect to the diffusion point, and $\theta N$ is an effective spread angle of the diffused light; and $$0.05 < \theta N \ min < 20.50$$

where $\theta N \ min$ is a minimum value of the effective spread angle.

2. The optical system according to claim 1, wherein the following inequality is satisfied:

$$1.0 < \theta p/\theta d < 300.0.$$

3. The optical system according to claim 1, wherein the diffusion element is disposed on a condensing surface of a condensing optical system and the condensing optical system is disposed on an object side of the diffusion element.

4. The optical system according to claim 1, wherein the following inequality is satisfied:

$$\theta p < \theta w - 2 \times \theta ax$$

where $\theta ax$ is an angle formed by a principal ray of the incident light beam and a straight line connecting the diffusion point and a center of the entrance pupil of the imaging element, and $\theta w$ is an effective diffusion angle at the diffusion point.

5. The optical system according to claim 1, wherein the incident light beam includes infrared light with a wavelength of 700 nm or longer.

6. The optical system according to claim 1, wherein the following inequality is satisfied:

$$500 < \Phi p/\lambda < 15000$$

where $\lambda$ is a wavelength of the incident light beam, and $\Phi p$ is an effective diameter of the imaging element.

7. The optical system according to claim 1, further comprising an imaging array including a plurality of imaging portions arranged in a direction orthogonal to an optical axis,
wherein the imaging array forms a plurality of images corresponding to the plurality of imaging portions.

8. The optical system according to claim 7, further comprising a plurality of optical filters arranged on optical paths of the plurality of imaging portions,
wherein the plurality of optical filters includes two optical filters having transmission characteristics different from each other.

9. The optical system according to claim 8, wherein an optical filter that transmits a longest wavelength light among the plurality of optical filters is disposed at a center of the plurality of optical filters when viewed from an optical axis direction.

10. The optical system according to claim 1, wherein the diffusion element has a diffusion surface having a periodical structure, and
wherein the maximum value is expressed by the following equation at least within the angle range:

$$\theta d = arc \ sin(\lambda/p)$$

where $\lambda$ is a wavelength of light imaged by the imaging element, and p is a pitch of the periodical structure.

11. The optical system according to claim 1, wherein the intervals between the peak intensities is non-uniform at least within the angle range.

12. The optical system according to claim 1, further comprising an image sensor.

13. The optical system according to claim 1, wherein the optical system is attachable to and detachable from an image pickup apparatus that includes an image sensor.

14. The optical system according to claim 1, wherein the optical system is attachable to and detachable from a lens apparatus disposed on an object side of the diffusion element.

15. An optical apparatus comprising the optical system according to claim 1.

16. An optical system comprising:
a diffusion element configured to diffuse an incident light beam at a diffusion point and to emit diffused light, and
an imaging element configured to form an image of the diffusion point,
wherein peak intensities in a diffusion angle distribution characteristic of the diffused light are discrete, and
wherein the following inequalities are satisfied:

$$1.0 < (\theta p + \theta N)/\theta d < 300.0$$

where $\theta d$ is a maximum value of intervals between the peak intensities in the diffusion angle distribution characteristic, $\theta p$ is an angle range of an entrance pupil of the imaging element with respect to the diffusion point, and $\theta N$ is an effective spread angle of the diffused light;

$$0.05 < \theta N \ min < 20.50$$

where $\theta N \ min$ is a minimum value of the effective spread angle; and $$\theta p < \theta w - 2 \times \theta ax$$

where $\theta ax$ is an angle formed by a principal ray of the incident light beam and a straight line connecting the diffusion point and a center of the entrance pupil of the imaging element, and $\theta w$ is an effective diffusion angle at the diffusion point.

17. An optical system comprising:
a diffusion element configured to diffuse an incident light beam at a diffusion point and to emit diffused light, wherein the incident light beam includes infrared light with a wavelength of 700 nm or longer, and
an imaging element configured to form an image of the diffusion point,
wherein peak intensities in a diffusion angle distribution characteristic of the diffused light are discrete, and
wherein the following inequalities are satisfied:

$$1.0 < (\theta p + \theta N)/\theta d < 300.0$$

where $\theta d$ is a maximum value of intervals between the peak intensities in the diffusion angle distribution characteristic, $\theta p$ is an angle range of an entrance pupil of the imaging element with respect to the diffusion point, and $\theta N$ is an effective spread angle of the diffused light; and $$0.05 < \theta N \ min < 20.50$$

where $\theta N \ min$ is a minimum value of the effective spread angle.

* * * * *